United States Patent [19]

Frey et al.

[11] Patent Number: 5,188,292
[45] Date of Patent: Feb. 23, 1993

[54] THERMAL SHIELDS FOR ROTATING MEMBERS IN A GAS FLOW PATH

[75] Inventors: Luther R. Frey, Peck, Kans.; Francis L. DeTolla, Jupiter, Fla.

[73] Assignee: The United States of America as represented by the Secretary of the Air Force, Washington, D.C.

[21] Appl. No.: 724,309

[22] Filed: Jun. 28, 1991

[51] Int. Cl.⁵ .................. F02K 1/12; B64C 15/02; B64D 33/04
[52] U.S. Cl. ................... 239/127.3; 239/127.1; 239/265.17; 239/265.29; 60/232
[58] Field of Search ............ 239/127.1, 127.3, 265.17, 239/265.25, 265.27, 265.29; 60/232, 755, 757

[56] References Cited

U.S. PATENT DOCUMENTS

| H500 | 8/1988 | Stogner et al. | 239/265.25 |
|---|---|---|---|
| 4,037,405 | 7/1977 | Huenniger et al. | 60/229 |
| 4,071,194 | 1/1978 | Eckert et al. | 239/127.3 |
| 4,081,137 | 3/1978 | Sutton et al. | 239/127.3 |
| 4,203,286 | 5/1980 | Warburton | 60/266 |
| 4,544,098 | 10/1985 | Warburton | 239/127.3 |
| 4,690,329 | 9/1987 | Madden | 239/265.19 |
| 4,739,931 | 4/1988 | Stogner | 239/127.1 X |
| 4,767,055 | 8/1988 | Ward | 239/265.29 |
| 5,079,912 | 1/1992 | Cires et al. | 239/127.1 X |
| 5,080,284 | 1/1992 | Cires | 239/127.3 |
| 5,092,525 | 3/1992 | Roach et al. | 239/265.29 |

Primary Examiner—Andres Kashnikow
Assistant Examiner—William Grant
Attorney, Agent, or Firm—Thomas C. Stover; Donald J. Singer

[57] ABSTRACT

In a gas turbine engine, in a wall aperture of a 2-D variable area gas turbine exhaust nozzle, at least two members are rotatably and concentrically mounted in such aperture, substantially flush with the wall and in the path of hot exhaust gases flowing thereover, wherein an improvement is provided such that a) a heat shield is mounted on the wall downstream of the two concentric members b) a second liner is mounted on the inner concentric member and spaced thereabove and extends downstream over the outer concentric member, which is recessed relative to the second liner, which liner then overlaps the first liner, c) a third liner is mounted on the wall, upstream of the concentric members and spaced thereabove and extends downstream over the outer concentric member (to effectively submerge same) and overlaps the second liner, the liners being mounted in shingle-style overlap over the members including over the recessed outer concentric member, to thermally shield same. The liners are also elevated relative to the underlying wall and concentric members to provide a passage for cooling air therebetween.

9 Claims, 10 Drawing Sheets

ASSEMBLY - NOZZLE FULL OPEN

FIG. 1

ASSEMBLY-NOZZLE FULL OPEN

THERMAL SHIELDS FOR ROTATING MEMBERS IN A GAS FLOW PATH

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to thermal protection of static and movable components in a 2-D reverser nozzle of a gas turbine, particularly during high temperature operation.

2. The Prior Art

Two dimensional (2-D) variable area exhaust nozzles for gas turbine engines are known in the art. See for example, U.S. Pat. No. 4,690,329 to Madden (1987), which patent is incorporated herein by reference. A 2-D nozzle is mounted in the aft end of a jet engine to modify and/or direct the jet blast exiting the nozzle within desired limits during flight, including redirecting such blast so as to provide reverse thrust to such engine.

Figure 3:
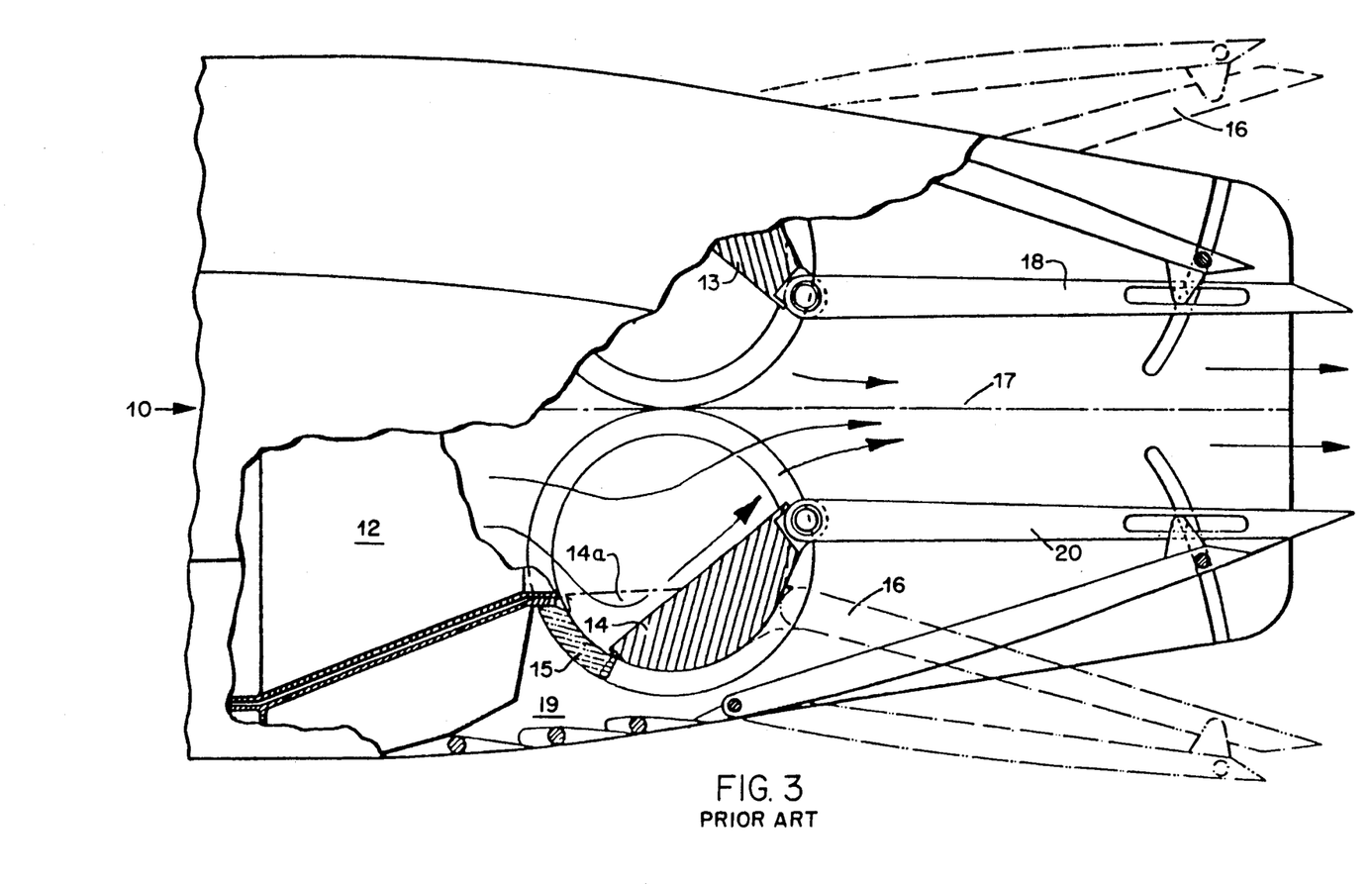
FIG. 3 is a partial sectional elevation view of convergent/divergent 2-D nozzle flaps of the prior art, wherein the convergent flaps are mounted on inner concentric discs and arc valves are mounted on the outer concentric discs, which flaps are in a rearward nozzle thrust position.
Figure 5:
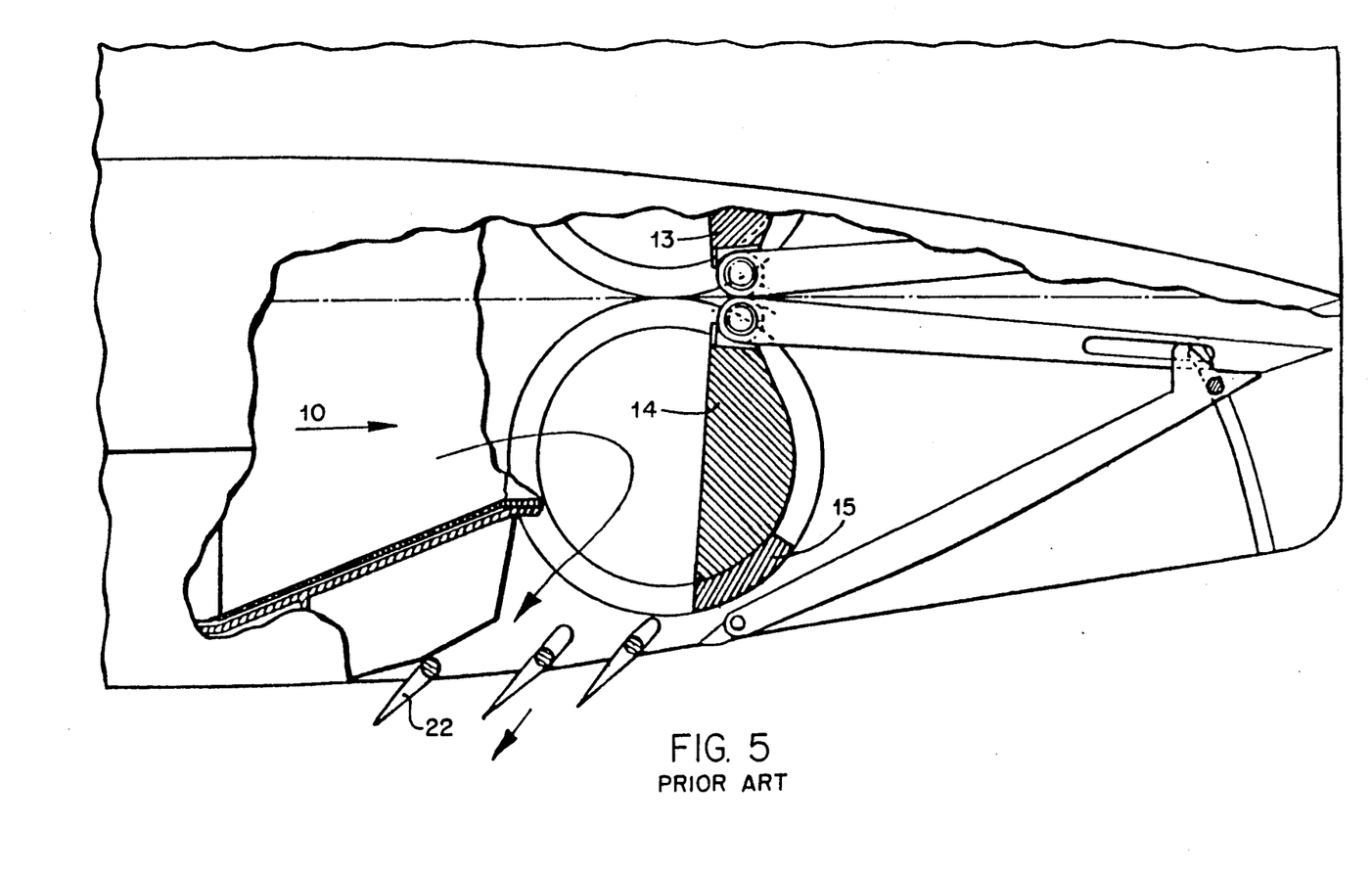
FIG. 5 is a sectional elevational view of the 2-D nozzle flaps of the prior art, shown in FIG. 3, with the convergent flaps in reverse thrust position and with the arc valve shifted thereunder, to provide a reverse thrust exit port for the engine exhaust gases, the normal 2-D variable area exhaust nozzle being closed.

Such prior art 2-D redirect or reverse thrust nozzle is similar to that shown in FIGS. 3 and 5 of the present application where the hot combusted gases 10 are directed rearwardly through tapering housing 12, between full-open nozzle flaps, such as flap 14a (in phantom) and out through divergent nozzle flaps, such as flap 16 (also in phantom) as indicated in FIG. 3. In the full open position, afterburner combustion can be applied to the hot gases 10 flowing toward the flaps 13 and 14, raising the temperatures of such gases therein to 4000° F. or more, which temperatures are corrosive to (and/or melt) most metals. Accordingly, during such afterburner operation, it is important to thermally protect components such as flaps 13 and 14 and arc valve 15, when they become exposed to the above hot afterburner gases.

Figure 4:
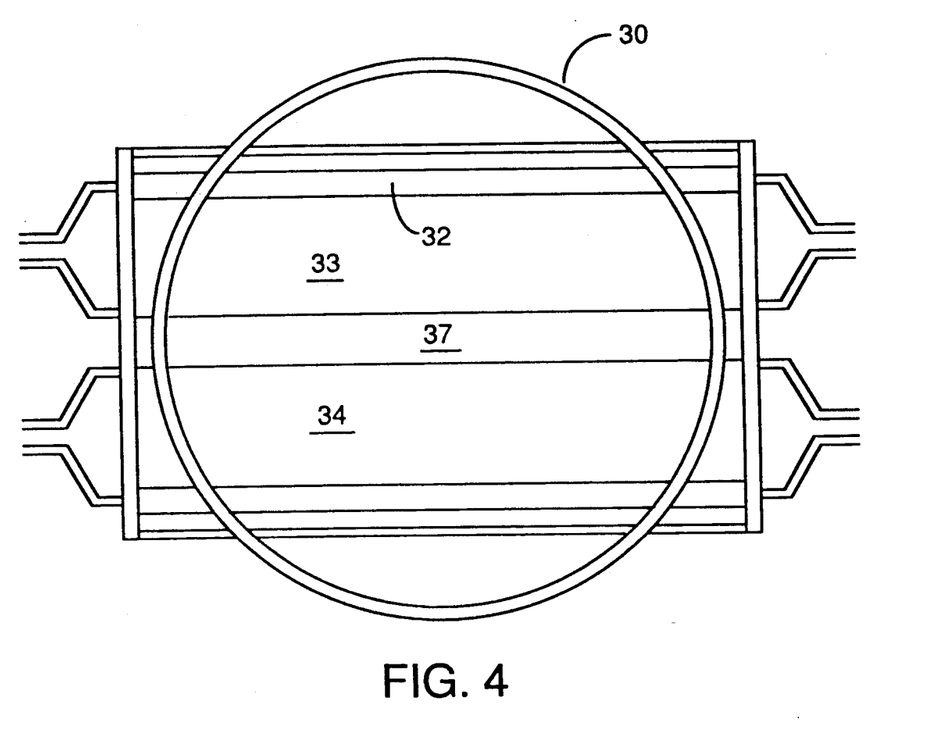
FIG. 4 is a cross-sectional view of similar convergent flaps pivoted by liner shielded concentric rotational members of the present invention, shown in more detail in FIGS. 2 and 7.

Further reviewing the prior art, with the afterburner shut off, the flaps 13 and 14 can be pivoted to narrow the exit throat 17 therebetween, as indicated in FIGS. 3 and 4 (e.g., to reduce thrust and save fuel). In such case, the arc valve, (e.g., valve 15) is now exposed by the pivoting of flap 14 and is subject to heating by the engine exhaust gases but remains closed so as to direct all such gases aft, along and between flaps 13 and 14 and then out rear nozzle flaps 18 and 20 as shown in FIG. 3. Subsequently, when it is wished to turn or reverse the direction of the exiting combusted gases, per FIG. 5, again with the afterburner shut off, flaps 13 and 14 are pivoted at near right angles to the oncoming gas 10, the arc valve 15 is now pivoted behind flap 14 and louvres 22 are opened so as to permit such engine gases to be turned by the closed flap valves 13 and 14 and redirected through the space previously occupied by the arc valve 15 and thence out through the open louvres 22, to provide reverse thrust and strong braking power to such engine 11.

The engine thus shown in the prior art is a workable 2-D reverser thrust nozzle. However, no discernable provision is made for thermally protecting certain components thereof from the corrosive effects of high temperature combustion gases particularly components such as the rotatable Wall support members for the flaps 13 and 14 and the arc valve 15, shown in FIGS. 3 and 5.

Other prior art makes provision for thermally insulating components for a convergent/divergent gas turbine engine exhaust nozzle, see U.S. Pat. No. 4,203,286 to Wharburton (1980). Such reference provides overlapping thermal shields for relatively static walls, which is not overly difficult but when as with the above 2-D reverser nozzle, certain functioning surfaces must pivot or rotate the attached shields or liners must do likewise, which can destroy the overlapped condition and expose the liner edges and/or underlying components.

It would seem one thing to provide overlapping liners for a static surface and a rotating surface but where there is a pair of concentric members which rotate in or next to a static surface, it would seem impossible to shield all edges at all rotated positions of both concentric parts along with the static surface.

Certainly there is no suggestion of how to solve such multi-liner problem in the above prior art. Accordingly, there is a need and market to provide a thermal shield or liner system for a plurality of rotating and static members that overcomes the above prior art shortcomings.

There has now been discovered a liner system that provides overlapping thermal shields for at least one static member or surface and a plurality of pivoting or rotating members proximate thereto, to thermally protect such members or components from corrosive combustion gases in a 2-D reverser nozzle of a jet engine, including during the afterburner operation thereof.

SUMMARY OF THE INVENTION

In a gas turbine engine, having in an aperture in a wall near the exhaust nozzle thereof, at least two members rotatably and concentrically mounted in the wall aperture and in the path of hot combustion gases flowing through the nozzle, the improvement comprising:

a) a first heat shield liner mounted on the wall downstream of the concentric members, b) a second liner mounted on the inner concentric member and extending downstream over the outer concentric member and overlapping the first liner, c) the outer concentric member being recessed relative to said second liner and d) a third liner mounted on said wall upstream of the concentric members and extending downstream over the outer concentric member to effectively submerge same and overlapping the second liner, the liners being mounted in shingle style overlap over the members including the submerged outer concentric member, to thermally shield same.

In a preferred embodiment of the invention, air cooling passages are provided between the above liners and the underlying static or rotational member surfaces for air cooling thereof.

In a further preferred embodiment, wall liners extend over concentric rotational members which revolve flaps in 2-D variable area exhaust nozzles for gas turbines, including convergent/divergent gas turbine exhaust nozzles having reverse thrust capability.

BRIEF DESCRIPTION OF THE DRAWINGS

The invention will become more apparent from the following detailed specification and drawings in which.

DESCRIPTION OF PREFERRED EMBODIMENTS

Referring now in more detail to the drawings, 2-D variable area exhaust nozzles for gas turbine engines are operated as discussed above, with respect to FIGS. 3 and 5 showing the prior art.

Figure 6:
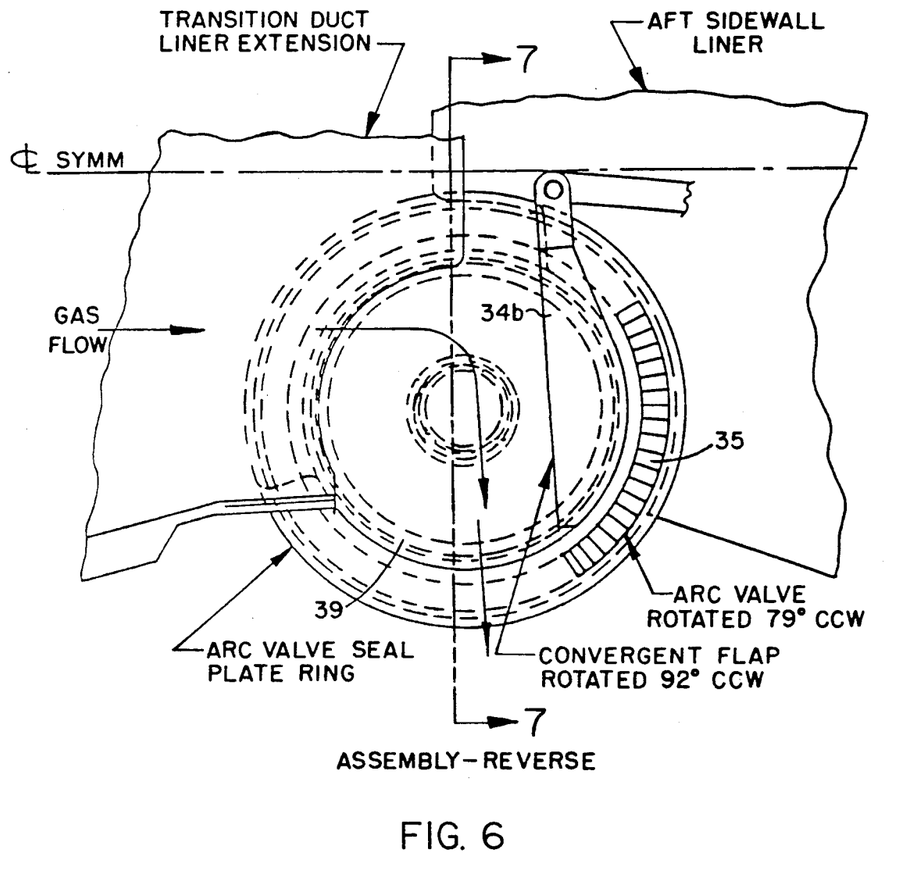
FIG. 6 is a schematic elevation view of the convergent flap and arc valve members of a 2-D nozzle of a gas turbine, both of which are pivoted by the concentrically rotated members (which are liner-shielded per the present invention) into thrust reversal position.

Reference to FIG. 1 of U.S. Pat. No. 4,690,329, of the prior art, more fully described above and incorporated herein by reference will illustrate how a gas turbine exhaust is structurally converted from rounded to rectangular cross-sectional shape (downstream). This structural conversion is indicated schematically in FIG. 4 herein, wherein the rounded cross-sectional shape 30 is converted to the rectangular (2-D) cross-sectional shape 32, which is defined in part by flaps 33 and 34, which converge to a narrowed rectangular opening 37. For the thrust reversal position, such flaps 33 and 34 are pivoted into near contact with one another, as indicated in FIGS. 5 and 6.

Figure 1:
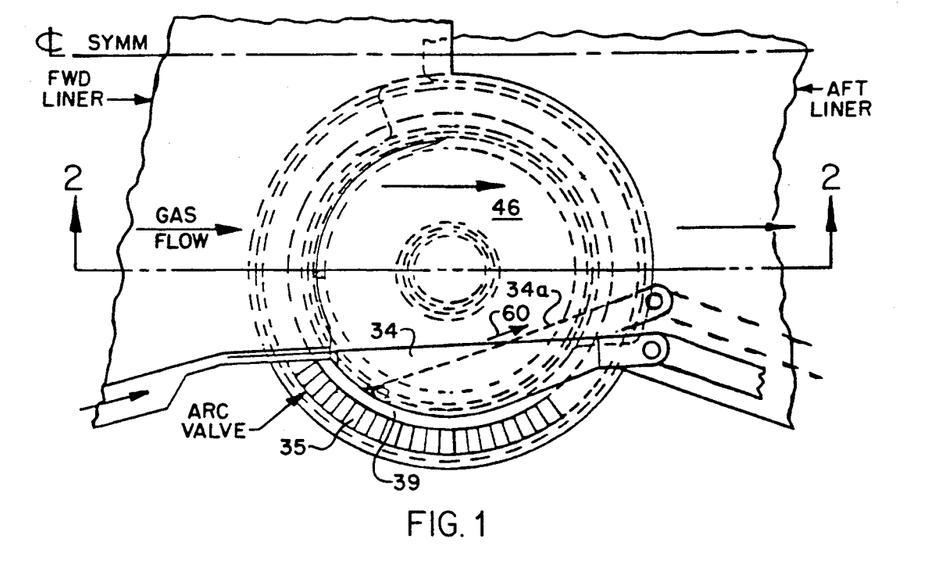
FIG. 1 is an elevation schematic view of concentric wall support members wherein a convergent flap is mounted on a inner concentric disc and an arc valve is mounted on a outer concentric member according to the present invention.

By way of comparison, FIG. 1 herein shows the convergent flaps 34 in the full Open position and FIG. 3 shows convergent flaps of the prior art, 13 and 14 in partial open position, with a reverse exit port 19 blocked by closed arc valve 15. Then FIG. 5 shows the convergent flaps 13 and 14 pivoted into near contact in the closed position, with arc valve 15 shifted thereunder, opening the thrust reversal port 19, relative to the prior art, while FIG. 6 shows members of the present invention, with corresponding flap and arc valve (thrust reversal) positions.

A main principle of the invention in protecting the concentric rotating members as well as their adjacent static members by thermal shields, is described below.

Figure 2:
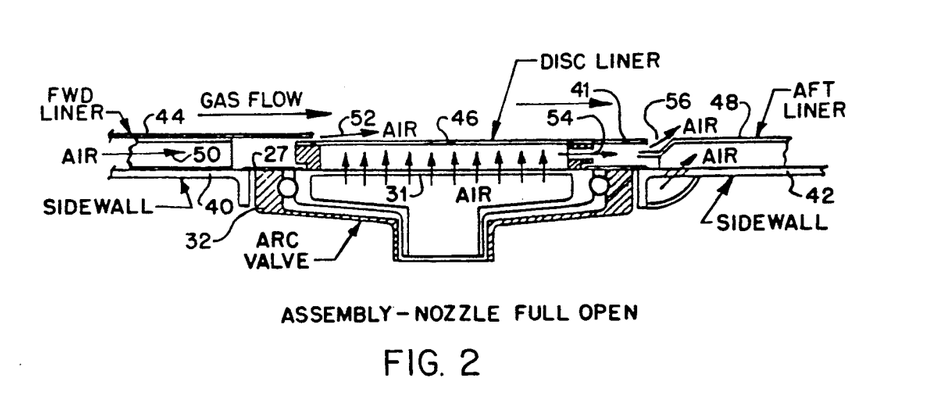
FIG. 2 is a cross-sectional elevation view of the rotational concentric members of the invention under liners mounted thereover, in shingle-style overlap, taken on lines 2—2, looking in the direction of the arrows.

As can be seen from FIG. 2, the elevation of the liners is what causes the outer concentric member 32 to be recessed. That is, the unshielded side wall 40, outer concentric member 32, inner concentric member 31 and the side wall 42, are on about the same level, as shown in FIG. 2.

However, the inner concentric member 31 has an elevated liner 46 while the outer concentric member 32 has no liner, which causes the recess thereof relative to the inner concentric member plus liner 46, as shown in FIG. 1. Side wall liner 44 is thus elevated sufficiently to extend across the recessed outer concentric member 32 and overlap the inner concentric member liner 46, which elevated liner in turn extends over the other side of the recessed outer concentric member 32 and then overlaps the aft side wall liner 48, as shown in FIG. 2. Thus, it is the overlapping liner configuration of the invention which effects the recessing and submerging of the outer concentric (arc valve) member 32.

The overlapping liners 44, 46 and 48 also provide cooling air passages between the so-overlapped liners and their underlying static and concentric members (40, 32, 31 and 42), per arrows 50, 52, 54 and 56, as shown in FIG. 2.

Figure 8:
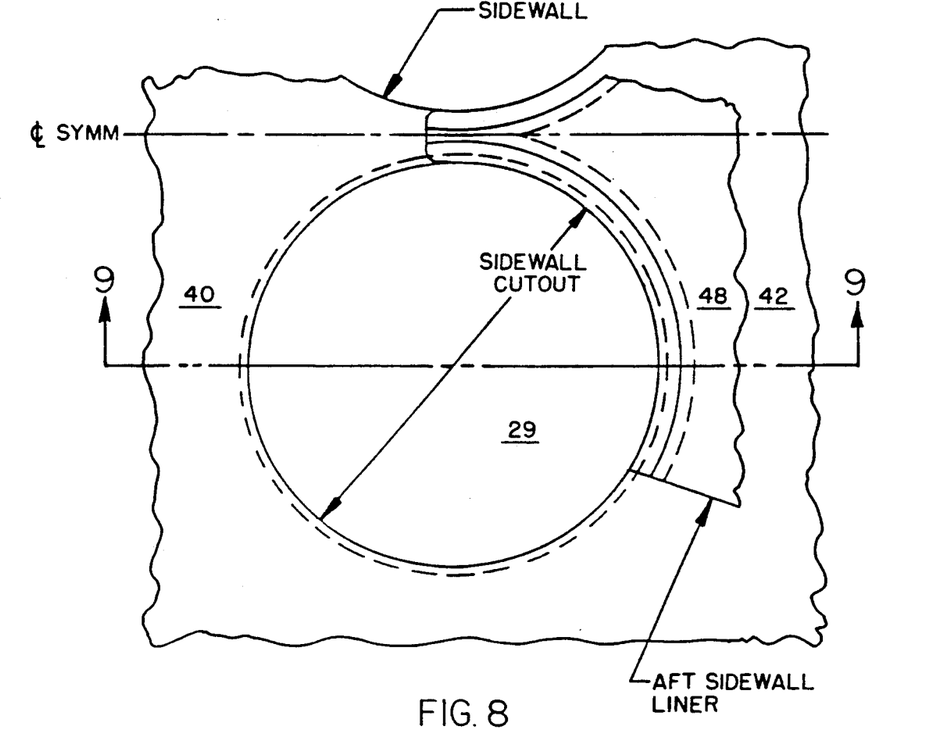
FIG. 8 is a fragmentary plan view of components of the liner assembly of the present invention.
Figure 9:
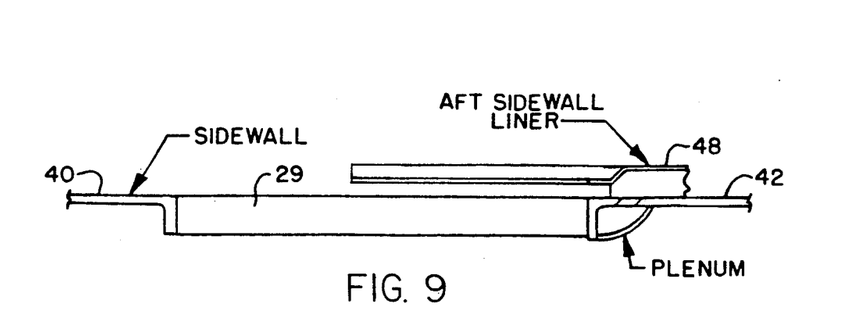
FIG. 9 is a sectional elevation view of the components of the invention shown in FIG. 8, taken on lines 9—9, looking in the direction of the arrows.

The above respective liner components are further discussed and illustrated separately for clarity. Thus, side wall cut-out 29 defines upstream side wall 40 and downstream side wall 42, which aft side wall 42 has elevated liner 48 thereover as shown in FIGS. 8 and 9.

Figure 10:
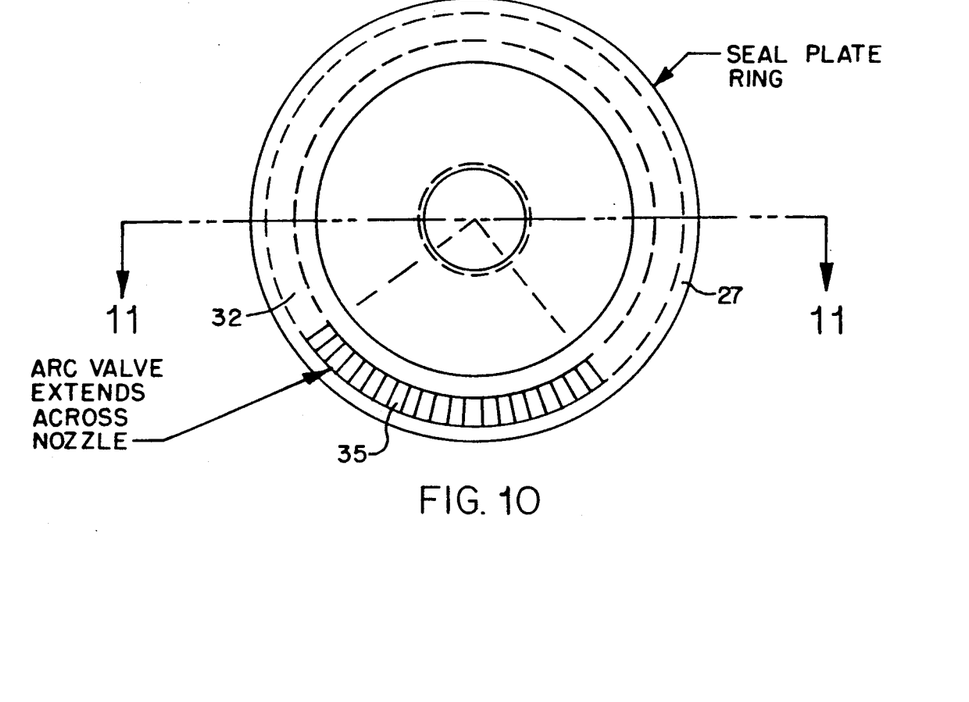
FIG. 10 is a plan view of another component of the liner assembly of the present invention.
Figure 11:
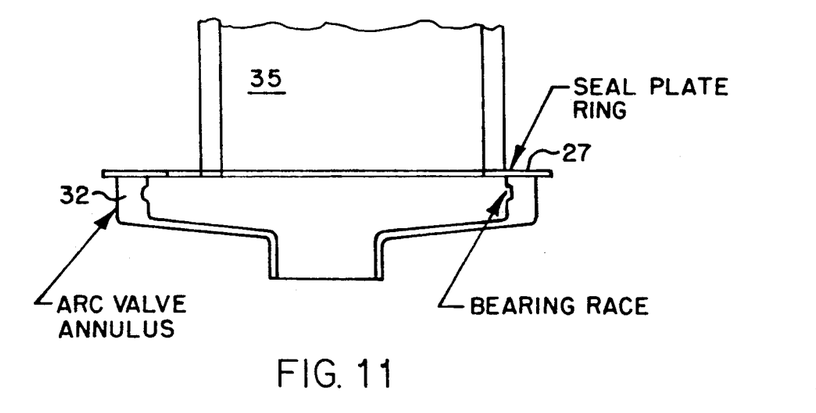
FIG. 11 is a fragmentary sectional elevation view of the component of FIG. 10, taken on lines 11—11, looking in the direction of the arrows.

Concentrically mounted in the side wall cut-out 29 (FIG. 8), is outer concentric member 32, having arc valve 35 mounted thereon or incorporated therein, with annular seal plate ring 27 mounted thereover, as shown in FIGS. 10 and 11.

Figure 12:
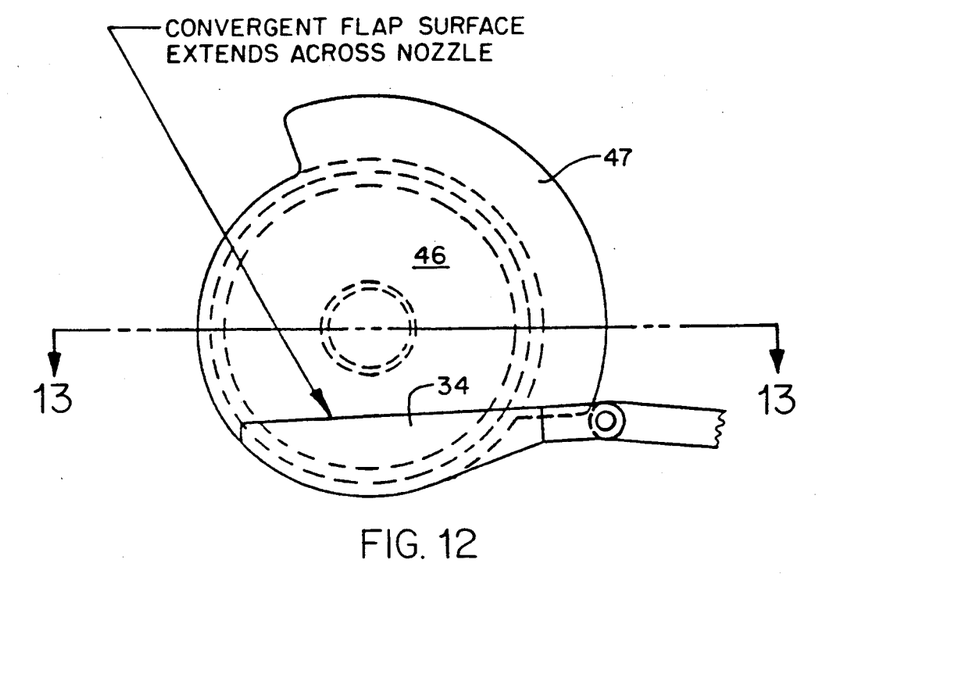
FIG. 12 is a fragmentary plan view of another component of the liner assembly of the present invention.
Figure 13:
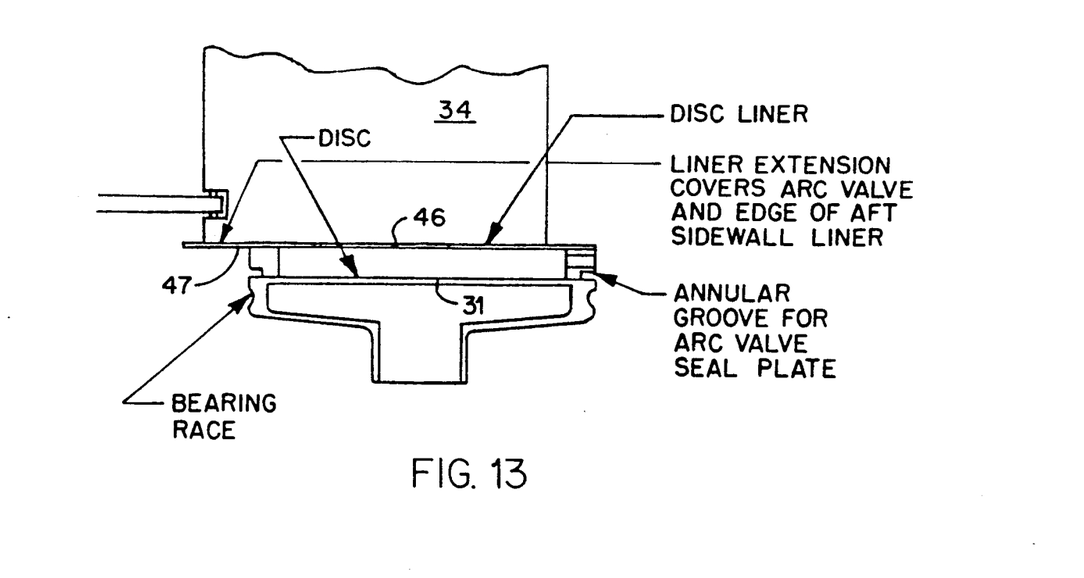
FIG. 13 is a fragmentary sectional elevation view of the component shown in FIG. 12, taken on lines 13—13, looking in the direction of the arrows.

Mounted within outer concentric member 32 is inner concentric member 31, having elevated liner 46 with overhanging liner extension 47 (with convergent flap 34 mounted to such member 46), as shown in FIGS. 12, 13 and 2. Liner extension 47 is that portion of the liner that extends over the recessed or submerged outer concentric member 32 and over the aft side wall liner 48, as shown in FIG. 2.

Figure 14:
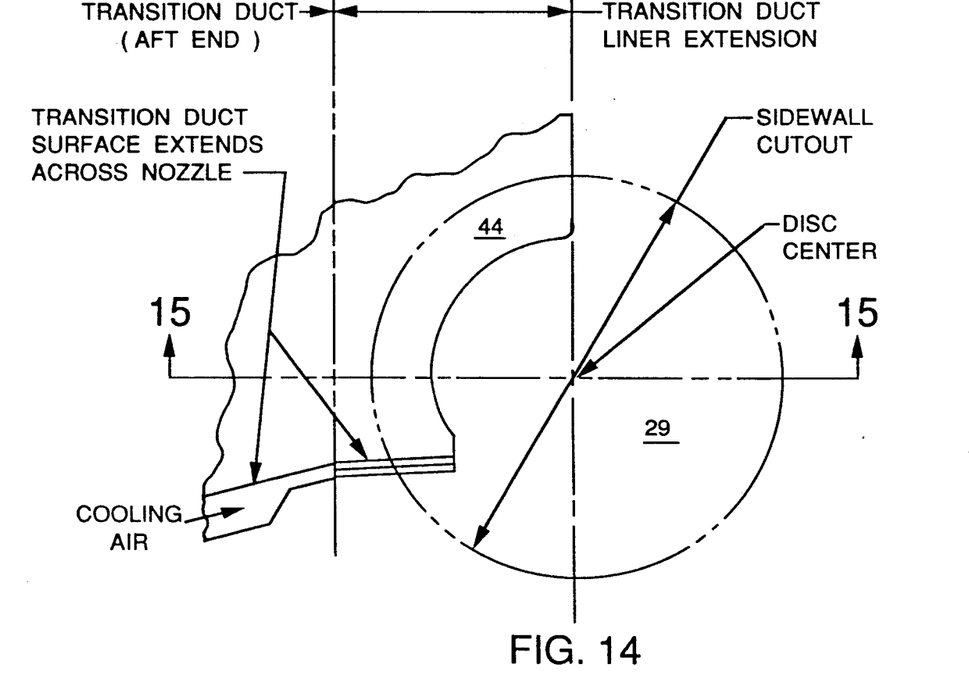
FIG. 14 is a fragmentary plan view of other components of the liner assembly of the present invention.
Figure 15:
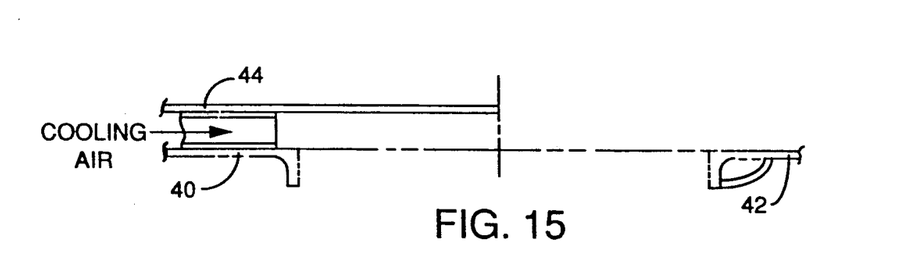
FIG. 15 is a fragmentary sectional elevation view of the components shown in FIG. 14, taken on lines 15—15, looking in the direction of the arrows.

Moving up the shingled liners step-wise, upstream side wall 40 has elevated liner 44 which extends over the cut-out 29 and thus over the two concentric members 32 and 46, as indicated in FIGS. 14 and 15 and shown in FIG. 2.

The liners and components thus shown in FIGS. 8 through 15 are thus shown assembled in dashed line overlap in FIGS. 1 and 6 and in cross-sectional view overlap in FIG. 2.

Such liner elevations in shingle style overlap, permits recession of the outer concentric member as aforesaid and permits overlapping liner protection of the underlying static and rotating components as augmented by the cooling air passages provided between such components and such overlapping liners e.g., per FIG. 2.

The above static and rotating components are desirably of light metal, e.g., titanium. The liners are of high temperature heat resistant metal such as nickel, or nickel alloys. Such alloys include, e.g. 15–20 wt % of chromium and 7–14 wt % of cobalt, the major portion of which is nickel. Such nickel alloys are commercially available, e.g., under the name of WASPALLOY or Haynes 188 or other suitable nickel alloy. Any other suitable liner material, can be employed within the scope of the present invention.

The above arc valve seal plate ring 27 can be of nickel or any nickel alloy, including the above described nickel alloys, as desired per the invention.

The above shingled liners are needed when augmented power is applied to the gas turbine engine. That is, with the convergent (34) and divergent flaps at full open, e.g. per FIG. 1, maximum afterburner power (max AB) can be applied and the exhaust gas temperatures passing through the 2-D convergent/divergent nozzle rise to, e.g. between 3000° to 4000° F. and e.g. 2000° to 3000° F. at the shingled liner surfaces, which temperatures melt most (unshielded) metals and of course the shingled liners of the invention are then most needed.

In military power, the convergent flaps 34 can be pivoted toward a less than full-open position, e.g. constricted per FIG. 3 (flaps 13 and 14), or into thrust reversal, with closed convergent flaps per FIGS. 5 and 6. In the flap constricted position shown in FIG. 3 and in the convergent flap, closed position, shown in FIGS. 5 and 6, portions of the outer concentric member or arc valve are exposed to non AB exhaust gases. However these gases are at about one-half the temperature of max AB (above) or in the range of 1200° to 1600° F., in which range the liner covered members can be maintained at about 1000 F., at which temperature titanium is durable.

Convergent flap 34 (and flap 35) can be revolved or pivoted on disc 31 to various positions from full open, per flap 34 shown in FIG. 1, to a more convergent position per flap 34a, shown in phantom, also in FIG. 1. Thus such convergent flap can be pivoted to progressively increased positions of convergence (and with declining AB augmentation if desired), while the arc valve 35 remains in the closed position, as shown in FIG. 1.

With the flap 34 pivoted to a position of increased convergence, e.g., per flap 34a of FIG. 1, the arc valve 35 is exposed to hot gas flow (in the blocking thereof) but such valve has its own liner as do the convergent flaps described herein, which liners are outside the scope of the present invention and are not discussed further herein.

The arc valve is carried on a seal plate ring 27 shown in FIGS. 1 and 2, which ring keeps the cooling air (between overlapping liners and underlying wall or rotating members) from escaping to ambient air, as indicated in FIG. 2. With the arc valve 35 exposed, e.g. with the convergent flap in position 34a of FIG. 1, the seal plate ring 27 blocks these hot gases (including AB gases) from the bearing race and such gases are directed along the convergent flap 34a (per arrow 60) to discharge from the 2-D nozzle. Because of the blockage effect and cooling air (e.g., per arrow 50 of FIG. 2), there is not sufficient hot gas flow over such seal plate ring, even with AB exhaust gases, to overheat same.

When the flaps 34 are revolved to greater convergence angles (with the nozzle axis) e.g., from a flap position more convergent than that of flap 34a of FIG. 1, to flap position 34b of FIG. 6, the AB is shut off and the engine operates on "military power" at the lower temperatures noted above.

Figure 7:
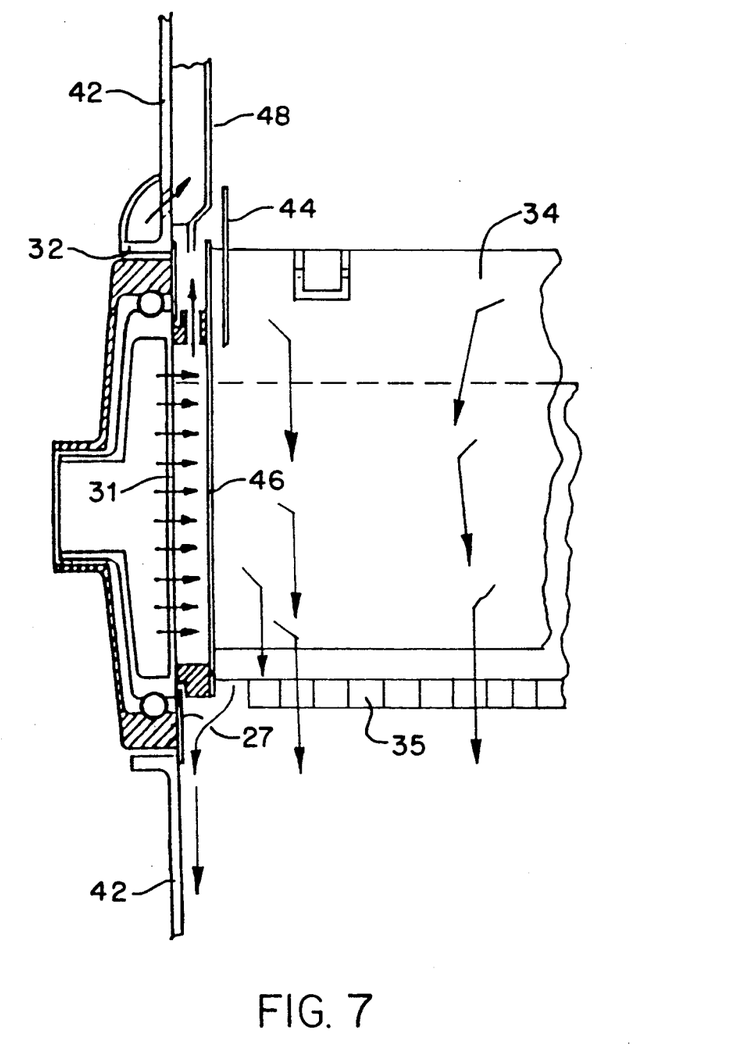
FIG. 7 is a cross-sectional elevation schematic view of heat shield liners of FIG. 6 taken on lines 7—7, looking in the direction of the arrows.

When the convergent flaps 34b are rotated sufficiently clockwise to block the normal downstream flow of exhaust gasses to nozzle (or nearly so rotated), the outer concentric member 32 is so coupled to the flap rotating disc 31, as to rotate the arc valve 35 counterclockwise behind the convergent flap 34b, so as to open exit port 39 and thus redirect the hot exit gasses off the blocking convergent flap 34b through such exit port 39, as shown in FIGS. 6 and 7.

As shown in FIGS. 6 and 7, the arc valve seal plate ring 27 is now exposed to the flow of exhaust gasses thereby. However as AB or augmented propulsion is not used during thrust reversal, such gasses instead of being heated to between 3000° to 4000° F. are heated to between about 1200° to 1600° F., which is not sufficiently high to require liner protection for such ring.

Accordingly, no cooling air or liner is required on such seal plate ring or the underlying outer concentric member, throughout the entire convergent flap (and arc valve) cycle described above. That is, these arc valve support members are successfully isolated from any cooling problem by submerging same below overlapped liners when necessary and exposed to exhaust gasses only during thrust reversal when liner protection isn't needed.

The liner assembly of the invention thus provides heat shield protection of the underlying component walls when it has to, e.g., at max AB flap configuration such as shown in FIGS. 1 and 2. The invention thus solves the problem of how to protect two rotating surfaces, mounted between two stationary surfaces, at all required rotated positions.

Accordingly, the arrangement of components and liners, according the the present invention, protects static members as well as concentrically rotating or pivoting members by relatively recessing the outer concentric member and shielding same behind overlapping shingles of liners as discussed above.

What is claimed is:

1. In a gas turbine engine having a propulsion nozzle, in an aperture, in a wall near said nozzle, at least two members, an inner member and an outer member, rotatably and concentrically mounted in the wall aperture, and in the path of hot combustion gases flowing through said nozzle, the improvement comprising:
    a) a first heat shield liner mounted on said wall downstream of the concentric members,
    b) a second heat shield liner mounted on the inner concentric member so as to extend downstream over the outer concentric member and overlapping said first liner,
    c) said outer concentric member being recessed relative to said second liner and
    d) a third liner mounted on said wall upstream of said concentric members and extending downstream over the outer concentric member, to effectively submerge same and overlapping said second liner, said liners being mounted in shingle-style overlap over said members including the submerged outer concentric member to thermally shield same.

2. The engine of claim 1 wherein a convergent flap is carried on said inner concentric member and an arc valve is carried on said outer concentric member.

3. The engine of claim 1 wherein the liner on the inner concentric member is spaced thereabove so as to relatively recess the outer concentric member.

4. The engine of claim 3 wherein said first and third liners over said wall upstream and downstream of said concentric members, are also spaced from said wall such that the liners define with said wall and concentric members thereunder, an air cooling passage therefor.

5. The engine in claim 1 wherein said wall and said concentric members, are of titanium and are shielded by said liners, which are of nickel alloy.

6. The engine of claim 2 wherein said wall and concentric members are mounted in a 2-D convergent/divergent nozzle.

7. The engine of claim 1 wherein said outer concentric member carries an arc valve which does not have its own separate heat shield liner.

8. The engine of claim 1 wherein a sealed plate ring is mounted to said outer concentric member and an arc valve is mounted to said ring on the other side thereof.

9. The engine of claim 1 wherein a convergent flap is mounted between a pair of opposed inner concentric members and an arc valve is mounted between a pair of opposed outer concentric members in combination with another such opposed converging flap and arc valve assembly in a 2-D nozzle, which four pair of concentric members and their associated upstream and downstream wall members, are protected by said liners mounted in shingle style overlap to thermally shield same.

* * * * *